Nov. 8, 1960   O. C. BREWSTER   2,959,207
SEAT MOUNTINGS FOR AIRCRAFT AND OTHER CONVEYANCES
Filed April 10, 1958

INVENTOR.
OSWALD C. BREWSTER
BY James G. Bethell
ATTORNEY

United States Patent Office 2,959,207
Patented Nov. 8, 1960

2,959,207

SEAT MOUNTINGS FOR AIRCRAFT AND OTHER CONVEYANCES

Oswald C. Brewster, Litchfield, Conn., assignor to Aerotec Industries, Inc.

Filed Apr. 10, 1958, Ser. No. 727,582

7 Claims. (Cl. 155—9)

This invention relates to an improvement in seat mountings for aircraft and other conveyances, and a primary object of my invention is to provide a construction embodying energy-absorbing means for yieldably and uniformly opposing generally forward movement of the center of mass of the seat and its occupant with respect to the aircraft or other conveyance to which the seat is secured in the event of sudden deceleration of the conveyance, as in the case of a crash-landing, for example.

A further object of the invention is to provide a construction in which the energy-absorbing means is of such a nature as to yieldably and uniformly oppose forward motion of the seat and its occupant throughout their entire travel, as distinguished from prior devices in which the opposition to forward movement of the seat and occupant gradually increases as the seat moves forward. In other words, with my improved construction opposition to forward movement of the seat is at its maximum at the instant the forces tending to move the seat forward are imposed, and opposition remains at maximum throughout the seat travel.

Other and further objects of the invention will be brought out in the following detailed description:

In the accompanying drawings.

Figure 1:
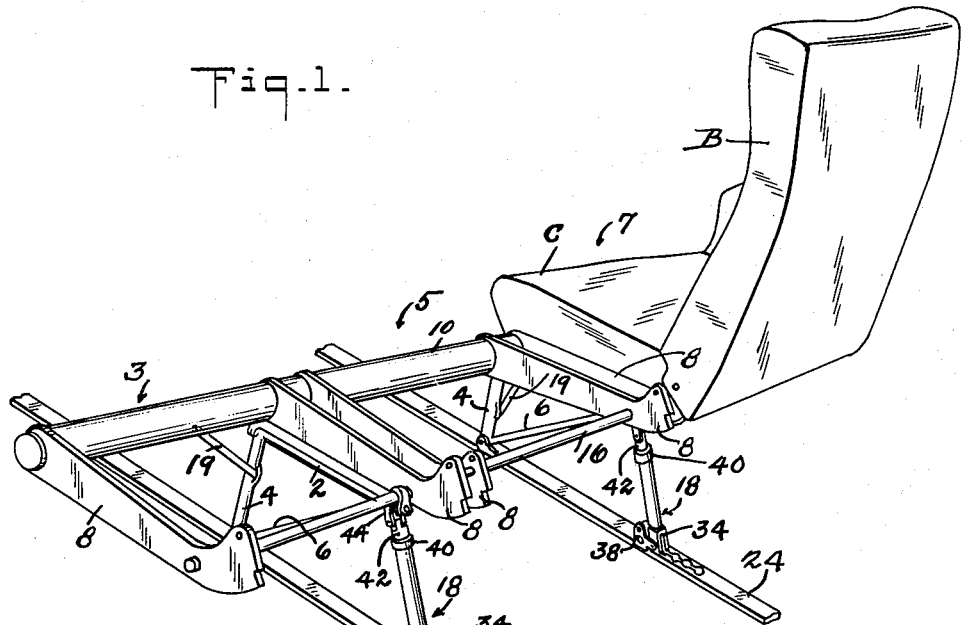
Fig. 1 is a fragmentary isometric view of an embodiment of my invention.
Figure 2:
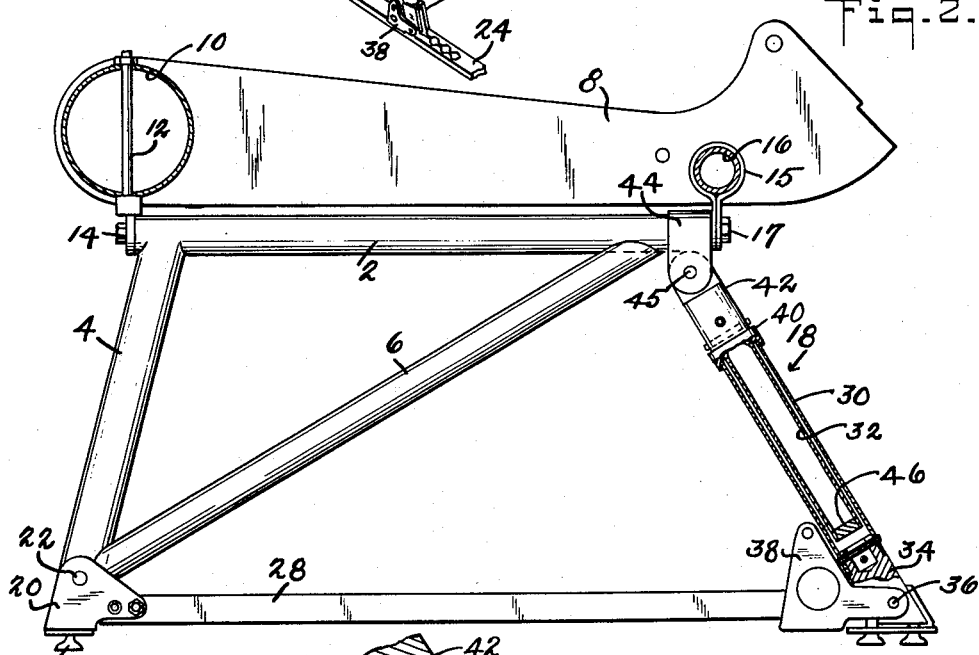
Fig. 2 is a side-elevational view, partially in section, of one of the leg frames and corresponding basic upper frame of my improved seat.
Figure 3:
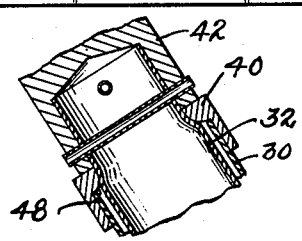
Fig. 3 is a fragmentary view, somewhat enlarged, illustrating the energy-absorbing device as incorporated in one of the seat legs.

For purposes of illustration and clarity of description and not by way of limitation, I have shown my invention applied to a triple or three-passenger seat for aircraft, and in the isometric view, Fig. 1 of the accompanying drawings, I have omitted the seat back, cushions, etc., except for the inboard end of the seat.

In general, in the application of my invention to seats for aircraft or other conveyances the seat is pivotally secured to the floor so as to permit of a generally forward movement of the center of mass of the seat and its occupant, means being provided for yieldably and uniformly opposing such movement and operative with the seat-securing means intact.

More specifically, the rear legs of the seat are telescopic, so as to elongate on the forward movement of the seat, this elongation and, hence, forward movement of the seat being opposed yieldably but uniformly by a draw-die arrangement incorporated in the seat legs. Such a construction, it will be appreciated, not only provides for absorption of the energy tending to throw the seat and its occupant violently forward upon abrupt deceleration of the aircraft, as in the event of a crash-landing, but the energy-absorbing means is operable at its maximum at the instant of crash and continuous to operate uniformly at its maximum throughout seat movement, with the securing means by which the seat is secured to the conveyance remaining intact.

Referring to the drawings in detail, the seat illustrated comprises what may be termed three transversely spaced frame sections, namely, outboard section 3, inboard section 7, and intermediate section 5. Each of these frame sections forms a basic structure to accommodate an individual passenger seat, the cushions C, back rest B, etc. of each individual seat being mounted thereon.

10 designates a torque tube, forming part of the frame sections, this tube lying along the front of the sections and extending from one end of the seat structure to the other. The torque tube passes through fore and aft stretchers 8 and may be secured thereto by welding or other suitable means.

16 designates a rear stretcher extending from one end of the seat structure to the other, parallel to the torque tube 10. This rear stretcher passes through the fore and aft stretchers 8 and is secured to them by welding or other suitable means.

It will be seen from the foregoing that each pair of fore and aft stretchers 8 with its portion of the torque tube 10 and rear stretcher 16 forms the basic frame for the upper portion of an individual passenger seat.

Supporting this structure at an appropriate distance from the floor are two leg frames, transversely spaced from each other, each comprising a rigid triangular structure embodying a fore and aft stretcher 2, a front leg 4, diagonal brace 6, and a rear leg assembly 18 pivoted to this triangular structure by pivot 45.

The leg frames are disposed transversely with respect to the upper seat structure as required by the configuration of the walls of the plane or other conveyance in which the seat may be installed and the location of the floor tracks 24 to which they are secured; they may or may not be symmetrically positioned with respect to the upper part of the seat structure.

The upper seat structure is secured to each leg frame by eye bolt 12, which passes through the torque tube 10 and in turn is secured to stretcher 2 by cap screw 14 and by strap 15, which passes around rear stretcher 16 and which is secured to the stretcher 2 by cap screw 7. Each leg frame is braced transversely by diagonal braces 19, extending from the front leg 4 to the torque tube 10.

The lower end of each of the front legs 4 is provided with a foot 20, pivoted to the leg so that the legs may swing in the fore and aft vertical plane about pivot 22. The feet 20 are secured to the floor track 24 by studs 26. Fastened to each of the front feet 20 is a bottom stretcher 28, extending rearwardly to the corresponding rear leg assembly 18.

As above pointed out, each rear leg assembly 18 is elongatable and essentially comprises two telescoping members, an outer or female member 30 and an inner or male member 32. Each female member 30 is provided at its lower end with a fitting 34, pivoted at 36 to a foot 38, which in turn is secured to the floor track 24. Each female member 30 at its upper end is provided with a guide or draw die 40. The upper end of each male member 32 of the leg assemblies is swaged down so that a short length of the male member extends above the upper end of the female member. Attached to this extension is an upper end fitting 42. Each of these fittings is pivotally attached through strap 44 and pivot 45 to stretcher 2. The shoulder formed on each male member 32, due to swaging, follows the contour of the die 40, so that, on assembly, the male member 32 is forced up against the die, and the end fitting 42 is attached thereto to form in effect a solid member, which remains so under normal conditions. On sudden deceleration of the conveyance, however, as in a crash-landing, for example, the male member of each leg assembly is ready to be drawn through the die 40 at full load. As above noted, that portion of the tubular male member 32 below the die 40 is larger in outside diameter than the inside diameter of the die. It will be seen, therefore, that, to move the member 32 upwardly, its diameter must be compressed by the die to permit it to pass through the die. The force required to draw the tubular male member through the die is substantially uniform and may be controlled at will within broad limits by controlling the amount of compression imposed on the tube by the die. The lower or inner end of each of the male members 32 is provided with an internal plug or stop 46, which prevents reduction of the diameter of this portion of each of the male members, thereby positively preventing their further outward movement.

Thus it will be seen that, while the upper seat structure, comprising sections 3, 5, and 7, can pivot forward in the event of sudden deceleration of the vehicle, this movement is yieldably and uniformly opposed by the draw die arrangement of the rear leg assemblies, with the means by which the front and rear legs are secured to the floor remaining intact, and that the distance traveled by the seat section is positively limited by the distance between the stop 46 of each male member 32 and the die 40 of each female member.

In passenger transports, for example, the structure is carefully designed. This is particularly true of the floor structure supporting the seats, which often consists of spaced transverse beams supported by the outer shell of the fuselage, the beams being built to withstand a certain total bending moment from forces acting vertically either upward or downward. Inasmuch as the leg frames are spaced transversely across the floor in the employment of my invention, the downward forces exerted at the front legs and upward forces exerted at the rear legs of each frame will be exerted at spaced intervals along the seat-supporting beams. It is a well known principle of beam loading that, for a beam capable of withstanding a given bending moment, the nearer the load is applied to the beam supports the greater the load which the beam can support without exceeding its allowable bending moment. Thus it is apparent that, for a given total vertical loading of the seat structure, the more that can be imposed at the outboard end (the left-hand end in the isometric view, Fig. 1), the less will be the bending moment to which the beam is subjected.

To take advantage of these characteristics, the energy absorber in the rear leg of the outboard leg frame may be designed to be more resistant than the absorber of the rear leg of the inboard leg frame. The torque tube 10 transmits torque from one end of the seat section to the other end of the seat section, so that, with the energy absorber in the inboard rear leg yieldable under lighter load than the absorber of the other or outboard leg, the torque tube 10 will transmit to the outboard leg the torque in excess of that required to cause the inboard energy absorber to yield, and, inasmuch as the outboard leg is nearer the outboard end of the floor beam than the inboard leg, a higher total load is permitted without danger of causing the beam to fail.

From all of the foregoing it will be seen that, as applied to seats for conveyances such as aircraft, for example, the center of mass of the seat with its occupant, being located considerably above the seat proper, is permitted under overload conditions—crash-landing, for instance—to have a generally forward motion, yieldable means being provided, however, for uniformly opposing such motion, the yieldable means being operative with the securing means by which the seat is secured to the conveyance remaining intact.

It will be seen also that in the embodiment illustrated a construction is provided wherein the two ends of a seat section, each of which is secured front and rear to the floor, are connected to each other by torque-transmitting means, whereby torque is transmitted from one end of the seat to the other, so that, by so designing the yieldable means at the inboard end of the seat that it will yield under a lighter load than the yieldable means at the outboard end, the torque above that required to cause the inboard yieldable means to function will be transmitted to the outboard end of the seat section, thereby to permit of a higher total loading than otherwise would be the case.

It is to be understood that changes may be made in the details of construction and arrangement of parts above described without departing from the spirit and scope of my invention.

What I claim is:

1. A seat for conveyances comprising, in combination, a seat frame; seat-supporting front and rear legs, one of said legs being rigidly secured at its upper end to said frame, the other leg being pivotally secured at its upper end to said frame; means for pivotally securing the other ends of said legs to the conveyance floor to permit the center of mass of the seat and its occupant to move relatively to the conveyance in the general direction of movement of the conveyance upon predetermined deceleration of the conveyance, the leg which is pivotally attached to the seat frame being elongatable upon said deceleration of the conveyance and constructed yieldably and uniformly to oppose such movement; and means incorporated in the last-mentioned leg to limit the extent of said movement of the center of mass of the seat and its occupant.

2. A seat for conveyances comprising, in combination, two transversely spaced leg frames, each provided with a front leg and a rear leg; means for pivotally securing each leg to the floor of the conveyance; means for pivotally attaching the upper end of each rear leg of each leg frame to the frame whereby a generally forward movement of the center of mass of the seat and its occupant is permitted; yieldable means, forming a part of each leg frame, each of said means uniformly opposing the said movement of the corresponding leg frame, said yieldable means of one leg being more easily yieldable than the yieldable means of the other leg; and torque-transmitting means connecting the leg frames, whereby, on said forward movement of the seat, the torque in excess of that required to actuate the weaker yieldable means will be transmitted to the other yieldable means.

3. A seat for conveyances comprising, in combination, an inboard leg frame, and an outboard leg frame transversely spaced from the inboard frame, each frame comprising a front leg and a rear leg; means for pivotally securing each leg to the floor of the conveyance; means for pivotally attaching the upper end of each rear leg of each leg frame to the frame to permit of a generally forward movement of the center of mass of the seat and its occupant; yieldable means, forming a part of each rear leg, each of said means uniformly opposing such movement of the corresponding leg frame, the said yieldable means of the inboard leg being more easily yieldable than that of the outboard leg; and torque-transmitting means connecting the two frames, whereby torque in excess of that required to actuate the yieldable means of the inboard leg is transmitted to the outboard leg.

4. A seat for conveyances comprising, in combination, a seat frame; seat-supporting legs therefor; means for rigidly connecting the upper end of one leg to the said seat frame; means for pivotally securing the upper end of the other leg to the seat frame; means for pivotally securing the lower ends of both legs to the conveyance floor, thereby to permit the center of mass of the seat and its occupant to move relatively to the conveyance in the general direction of movement of the conveyance upon predetermined deceleration of the conveyance; and means yieldably and uniformly to oppose said movement.

5. A seat for conveyances comprising, in combination, a seat frame; seat-supporting legs therefor; means for rigidly connecting the upper end of one leg to the said seat frame; means for pivotally securing the upper end of the other leg to the seat frame; means for pivotally securing the lower ends of both legs to the conveyance floor, the leg which is pivotally secured to the seat frame and to the conveyance floor elongating upon predetermined deceleration of the conveyance, thereby to permit the center of mass of the seat and its occupant to move relatively to the conveyance in the general direction of movement of the conveyance; and means yieldably and uniformly opposing such movement of the seat and its occupant.

6. A seat for conveyances comprising, in combination, a seat frame; and legs for supporting said frame, one of said legs being rigidly secured at its upper end to said frame and pivotally secured to the floor of the conveyance at its other end, another of said legs comprising a male member and a female member disposed in telescoped relation, the lower end of the female member being pivotally secured to the conveyance floor, the upper end of the male member extending beyond the upper end of the female member and being secured to the seat frame, whereby a generally forward movement of the center of mass of the seat and its occupant relative to the conveyance is permitted upon predetermined deceleration of the conveyance, such movement effecting relative linear movement between the said male and female leg-members, said female member having an area of smaller internal diameter than the outside diameter of that portion of the male member lying between this area and the lower end of the male member, whereby the said linear movement between the male and female members is yieldingly and uniformly opposed.

7. A seat structure for conveyances comprising, in combination, a plurality of transversely spaced seat frame sections, each adapted to accommodate an individual passenger seat; a pair of legs for each frame section; means for pivotally connecting the lower end of each of said legs to the conveyance floor; means for rigidly securing the upper end of one leg of each pair to said frames; means for pivotally securing the upper end of the other leg of each pair to said frame, the legs which are pivotally secured to the frames as well as to the conveyance floor elongating upon predetermined deceleration of the conveyance, thereby to permit the center of mass of the seat and its occupant to move relatively to the conveyance in the general direction of movement of the conveyance; means yieldably and uniformly opposing such movement; and torque-transmitting means connecting the said frames to each other.

References Cited in the file of this patent

UNITED STATES PATENTS

| | | |
|---|---|---|
| 2,227,717 | Jones | Jan. 7, 1941 |
| 2,401,748 | Dillon | June 11, 1946 |
| 2,516,172 | Baldwin | July 25, 1950 |
| 2,682,931 | Young | July 6, 1954 |
| 2,783,821 | Sherman | Mar. 5, 1957 |

FOREIGN PATENTS

| | | |
|---|---|---|
| 370,582 | Italy | Apr. 22, 1939 |